(12) United States Patent
Yamauchi

(10) Patent No.: US 7,676,111 B2
(45) Date of Patent: *Mar. 9, 2010

(54) IMAGE PROCESSING DEVICE AND IMAGE PROCESSING METHOD TO DETECT AND REMOVE IMAGE NOISES

(75) Inventor: Himio Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1046 days.

This patent is subject to a terminal disclaimer.

(21) Appl. No.: 11/363,056

(22) Filed: Feb. 28, 2006

(65) Prior Publication Data

US 2006/0192693 A1 Aug. 31, 2006

(30) Foreign Application Priority Data

Feb. 28, 2005 (JP) ............................. 2005-055041

(51) Int. Cl.
*G06K 9/40* (2006.01)

(52) U.S. Cl. ..................... 382/275; 382/168; 341/50; 348/607

(58) Field of Classification Search ............... 382/168, 382/275; 341/50; 348/607

See application file for complete search history.

(56) References Cited

U.S. PATENT DOCUMENTS

| | | | | |
|---|---|---|---|---|
| 4,485,403 A | * | 11/1984 | Illetschko | 348/607 |
| 5,949,916 A | * | 9/1999 | Chun | 382/261 |
| 6,373,533 B1 | | 4/2002 | Kawabata et al. | |
| 6,728,402 B2 | * | 4/2004 | Ruggiero et al. | 382/168 |
| 7,068,328 B1 | | 6/2006 | Mino | |
| 2005/0248687 A1 | * | 11/2005 | Lee et al. | 348/606 |
| 2006/0192693 A1 | | 8/2006 | Yamauchi | |

FOREIGN PATENT DOCUMENTS

| | | |
|---|---|---|
| JP | 02-233089 | 9/1990 |
| JP | 05-130512 | 5/1993 |
| JP | 06-054235 | 2/1994 |
| JP | 07-212627 | 8/1995 |
| JP | 08-98060 | 4/1996 |
| JP | 10-75386 | 3/1998 |
| JP | 2000-341559 | 12/2000 |
| JP | 2001-346228 | 12/2001 |
| JP | 2002-10105 | 1/2002 |
| JP | 3318248 B2 | 8/2002 |

* cited by examiner

*Primary Examiner*—Vikkram Bali
*Assistant Examiner*—Eueng-Nan Yeh
(74) *Attorney, Agent, or Firm*—Pillsbury Winthrop Shaw Pittman, LLP

(57) ABSTRACT

An inter-frame difference generation circuit generates, in every pixel unit, a difference level of an image between a present frame and a frame before one frame period. A histogram generation circuit generates a difference histogram indicating a frequency distribution of difference levels between the frames in a state in which a difference corresponding to a pixel including predetermined or more image changes is removed from generated difference levels. An erroneously detected histogram exclusion judging section excludes a histogram which is inappropriate as a histogram for use in deciding a noise amount among histograms generated by the histogram generation circuit from the histograms generated by the histogram generation circuit. A noise amount judging section decides the noise amount based on the histograms remaining without being excluded by the erroneously detected histogram exclusion judging section. Therefore, noises included in a dynamic image are detected with a good precision.

20 Claims, 15 Drawing Sheets

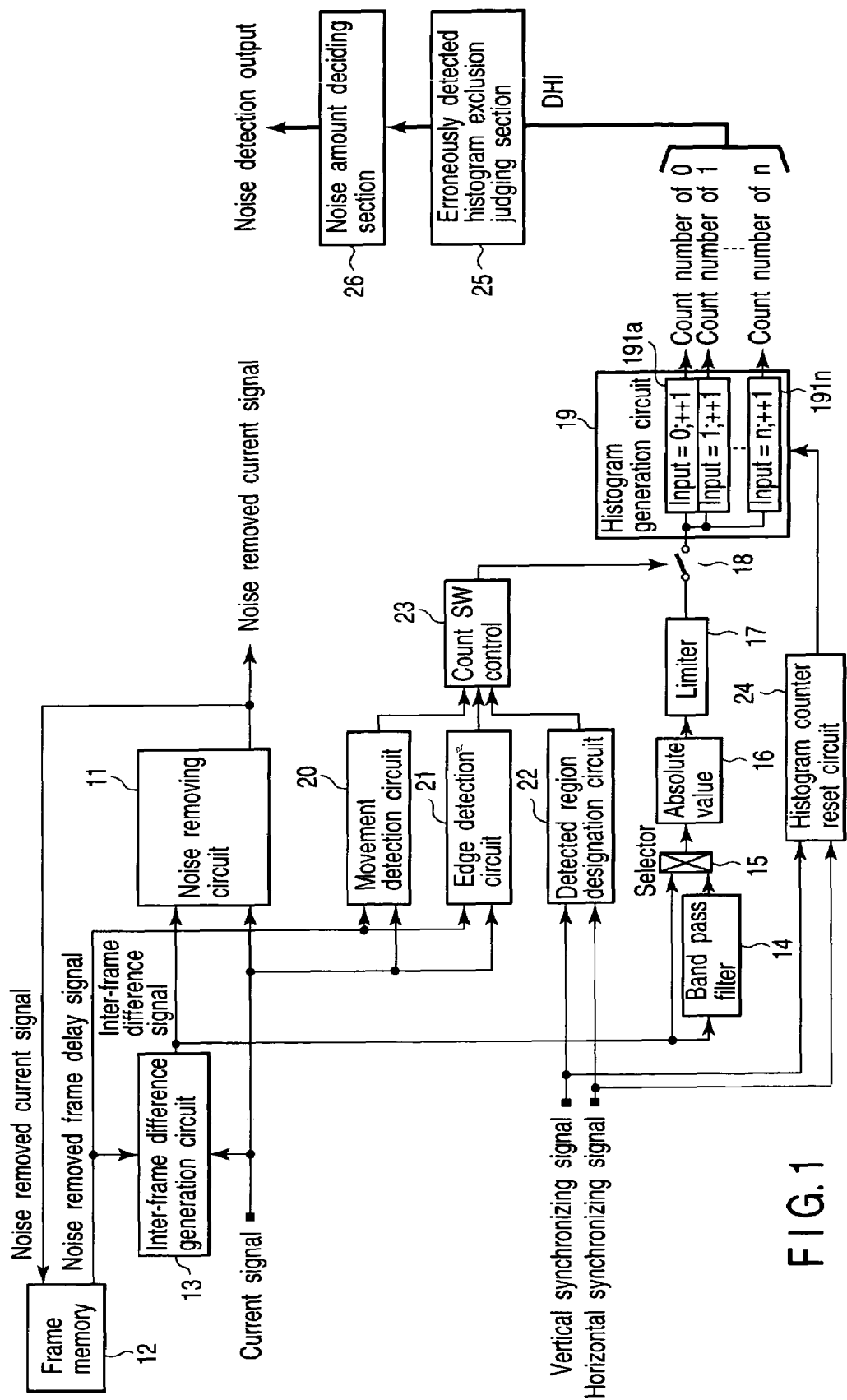
F I G. 1

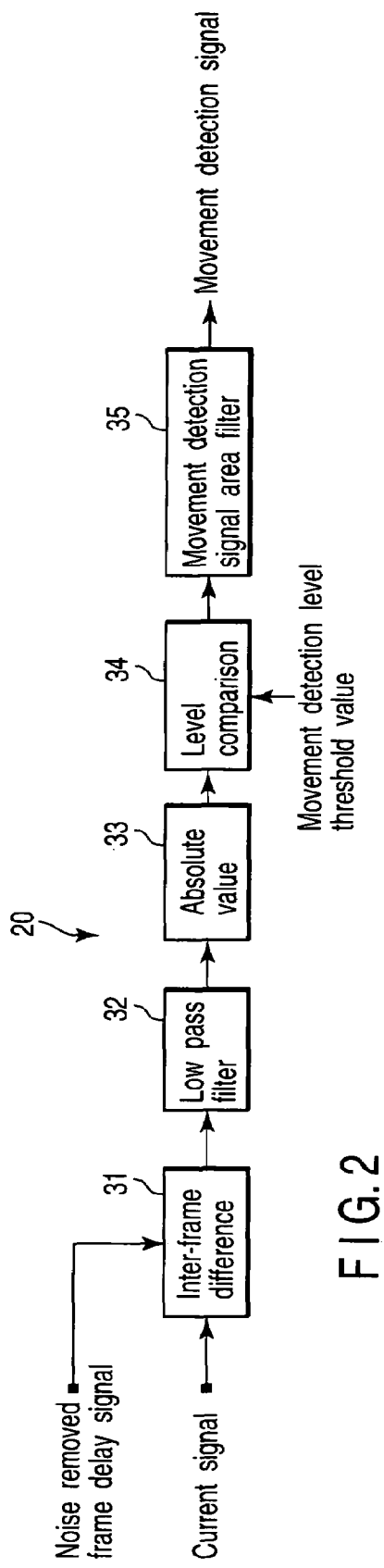
F I G. 2
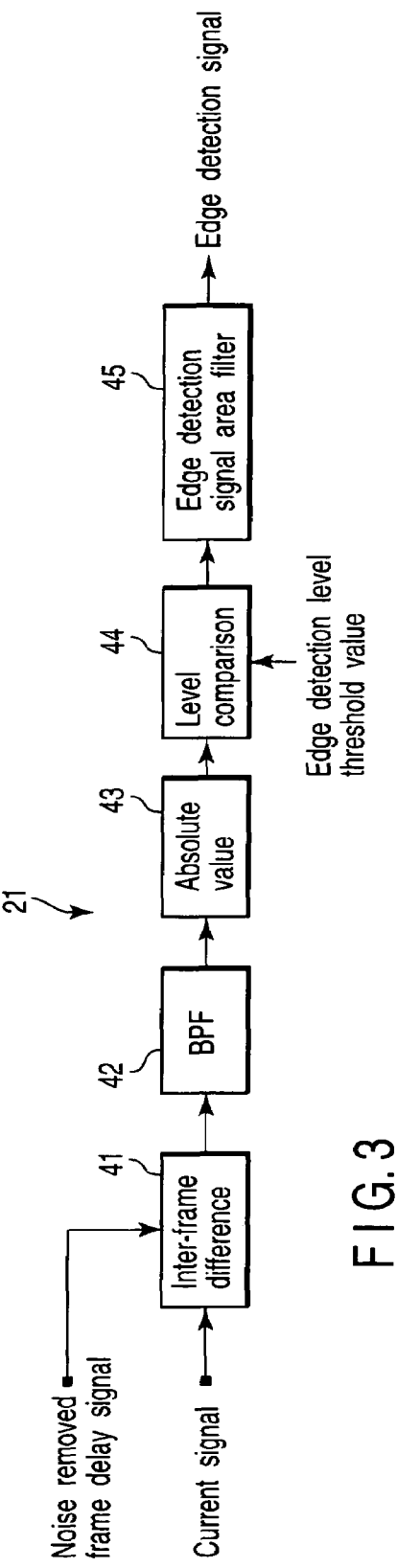
F I G. 3

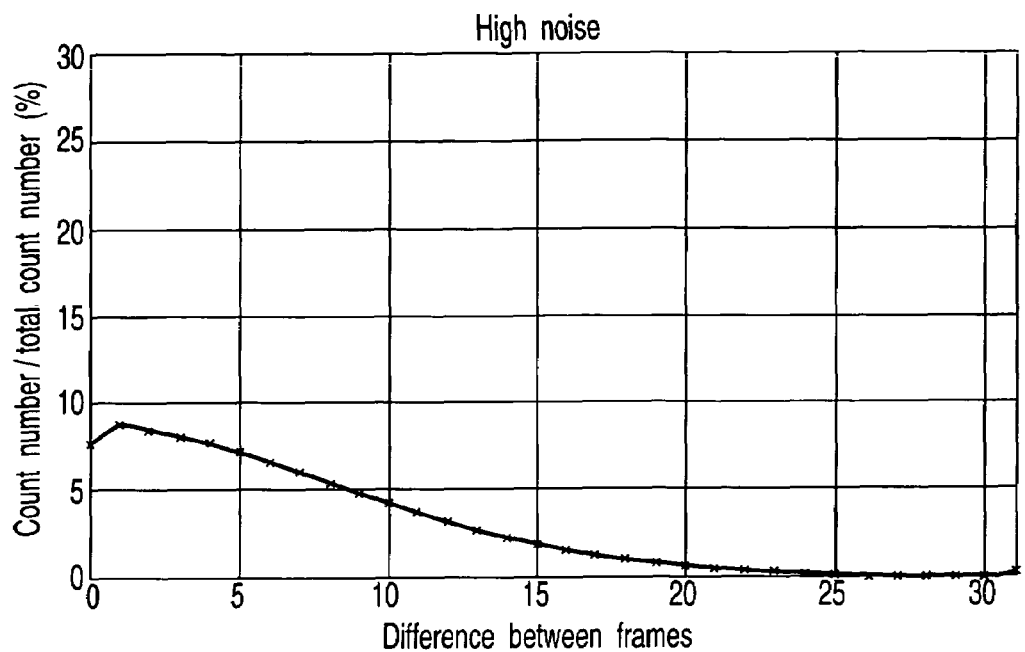
F I G. 4
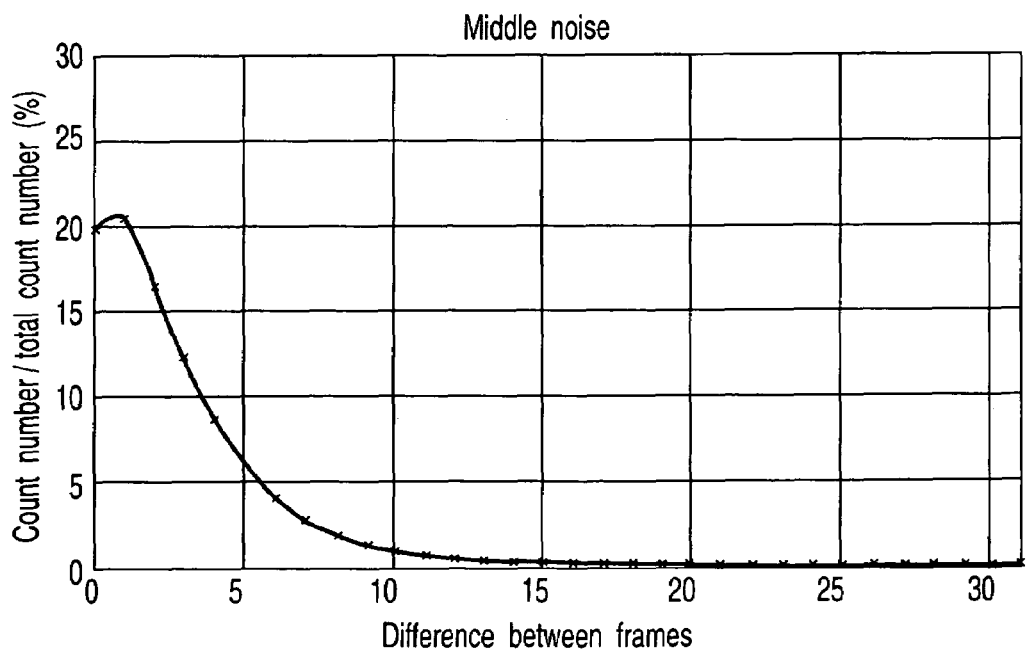
F I G. 5

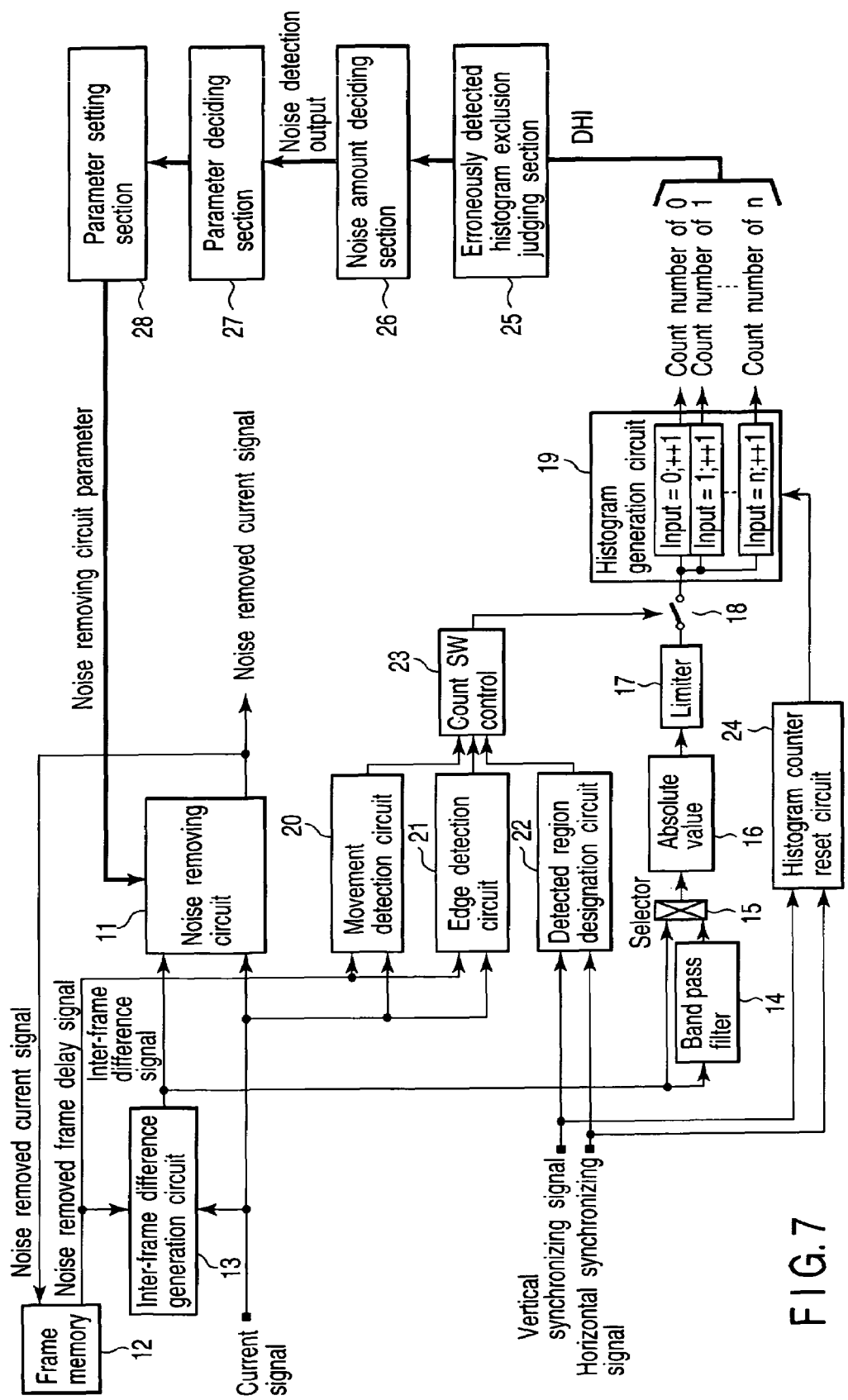
F I G. 7

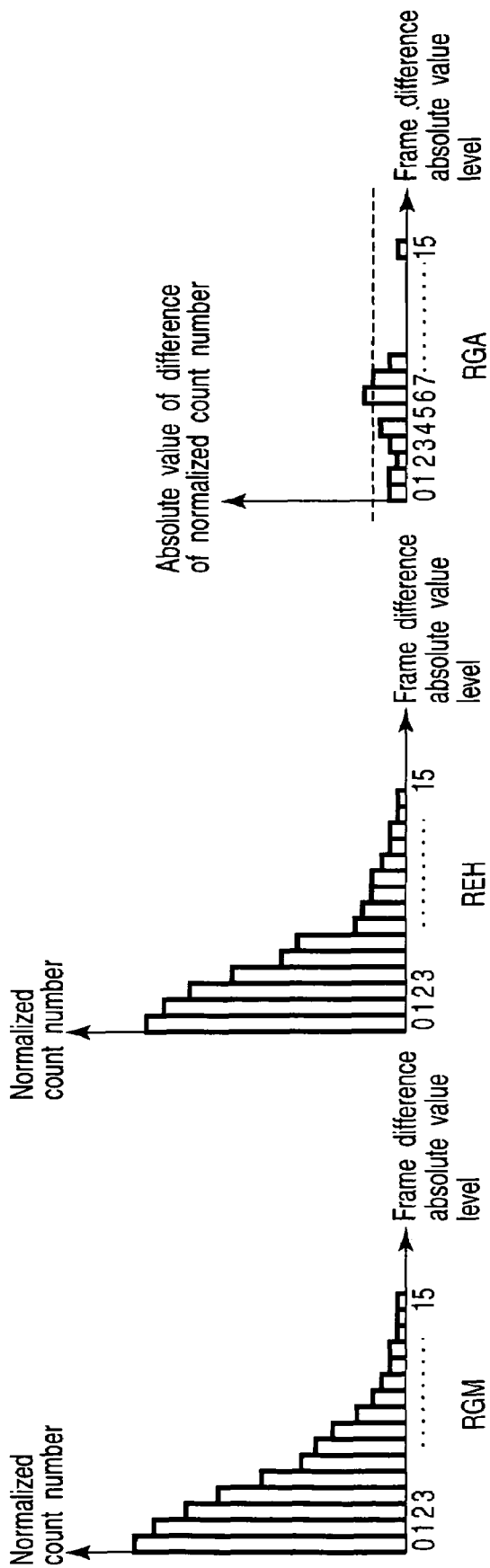

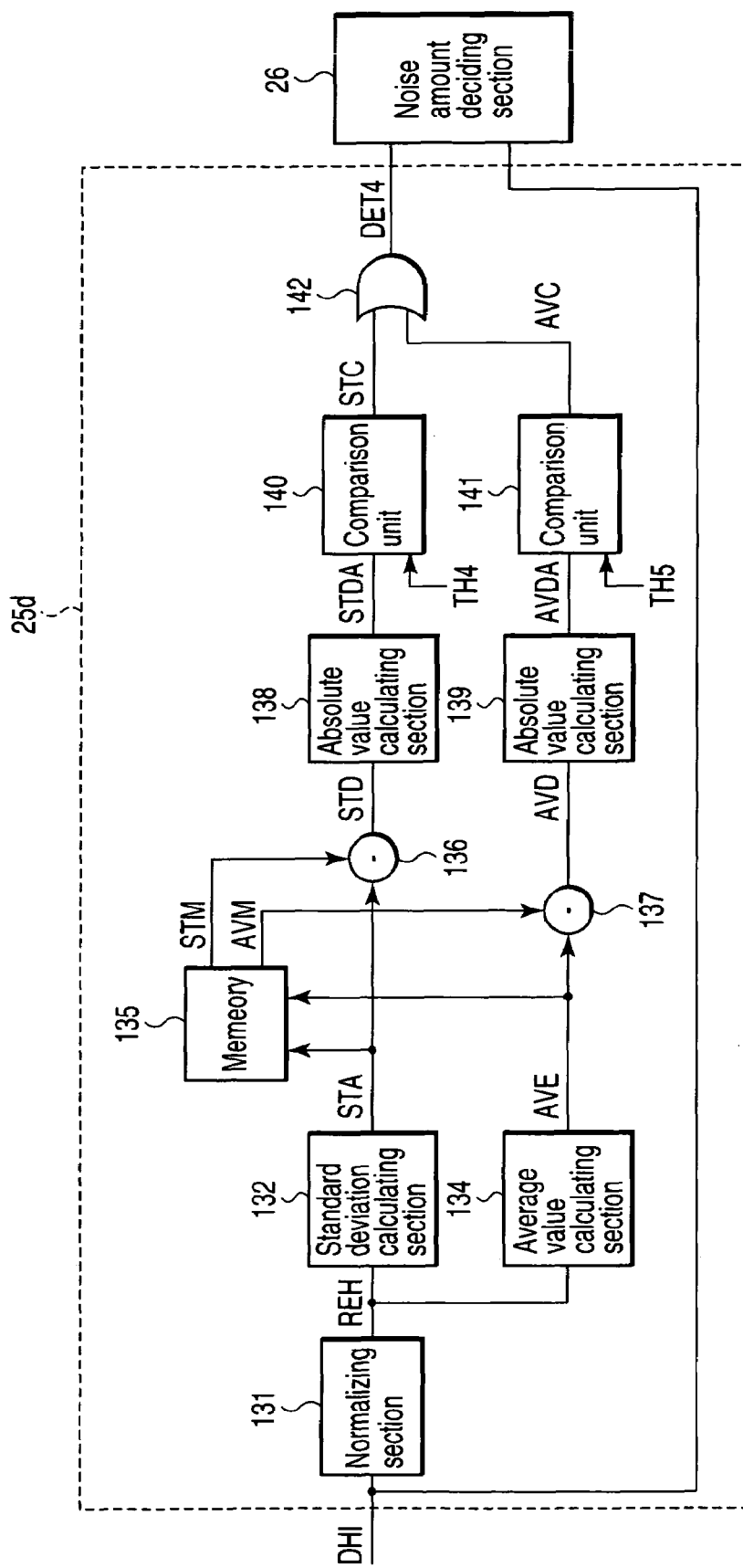
F I G. 13

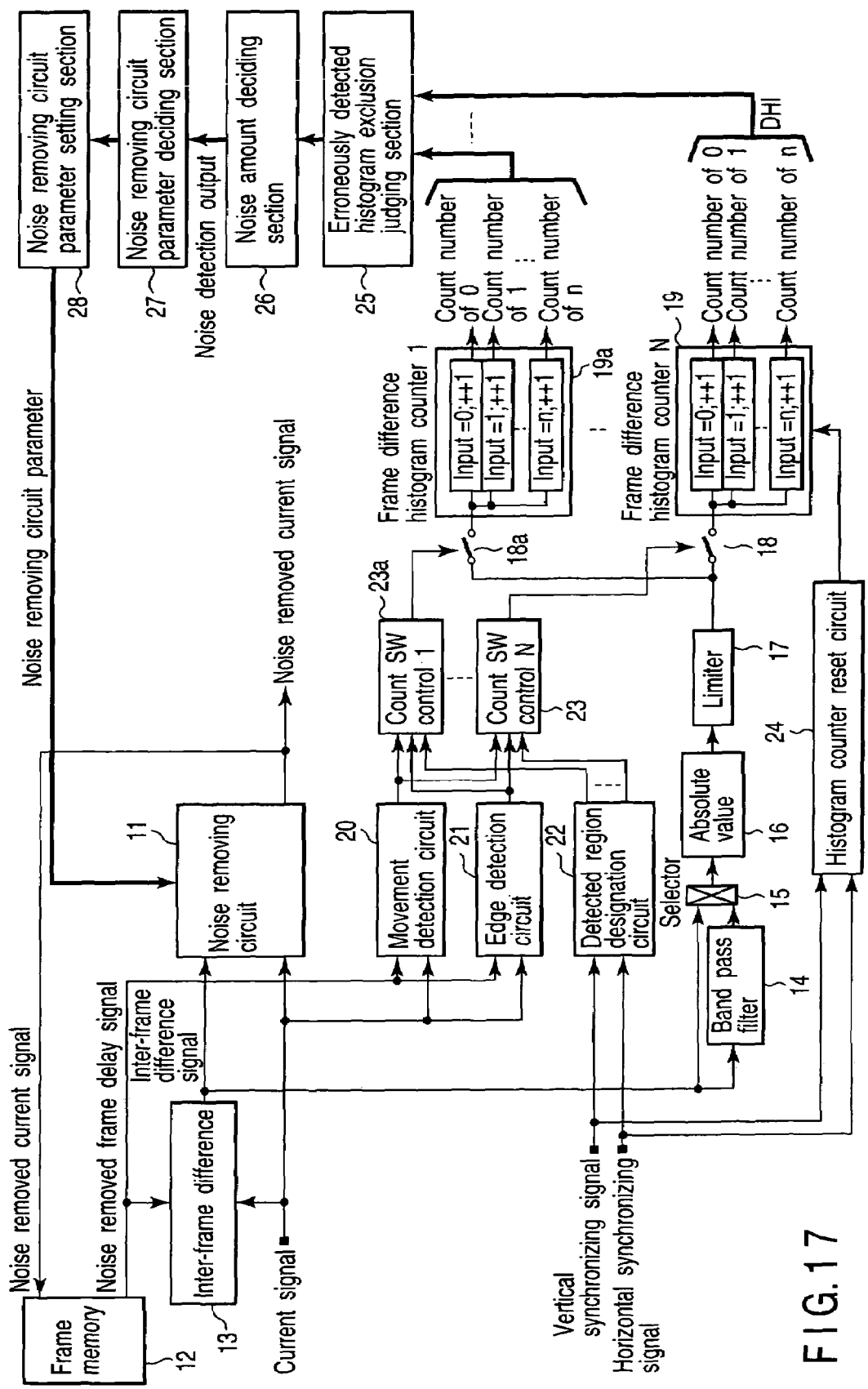
F I G. 17

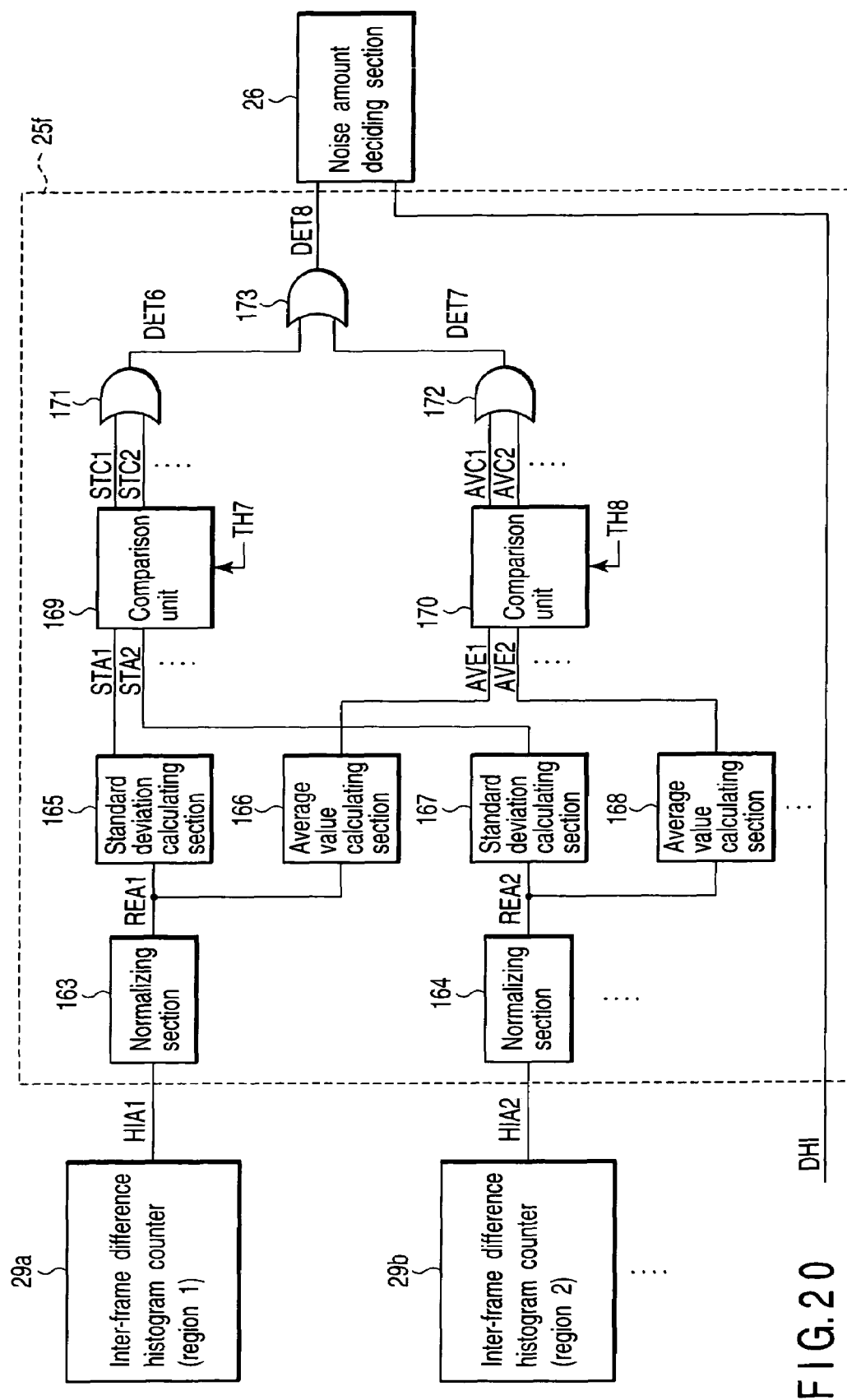
F I G. 20

IMAGE PROCESSING DEVICE AND IMAGE PROCESSING METHOD TO DETECT AND REMOVE IMAGE NOISES

CROSS-REFERENCE TO RELATED APPLICATIONS

This application is based upon and claims the benefit of priority from Japanese Patent Application No. 2005-055041, filed Feb. 28, 2005, the entire contents of which are incorporated herein by reference.

BACKGROUND

1. Field

One embodiment of the invention relates to an image processing device and an image processing method capable of detecting and removing noises included in a dynamic image.

2. Description of the Related Art

In a device such as a digital television receiver, there are various technologies for detecting noises included in a dynamic image.

For example, in Jpn. Pat. Appln. KOKAI Publication No. 2001-346228, there is disclosed a technology to calculate each absolute value (i.e., absolute difference) of a difference between pixel values of pixels corresponding to each other between continuous fields or frames in a video signal and accumulate the predetermined number of the calculated absolute differences, whereby extracting a value corresponding to a noise.

Moreover, in Jpn. Pat. Appln. KOKAI Publication No. 2-233089, there is disclosed a technology to obtain a difference of video signals corresponding to each other between the frames, square the difference, average the difference, and obtain a square root, whereby obtaining an only random noise that does not include any fixed pattern noise.

However, since the noise detection by the conventional technology is influenced by a change (picture change) of an image between the frames, the noise cannot be detected with a good precision.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary block diagram showing a constitution of an image processing device according to a first embodiment of the present invention;

FIG. 2 is an exemplary block diagram showing a constitution of a movement detection circuit shown in FIG. 1;

FIG. 3 is an exemplary block diagram showing a constitution of an edge detection circuit shown in FIG. 1;

FIG. 4 is an exemplary diagram showing an example of a histogram in a case where a noise is large;

FIG. 5 is an exemplary diagram showing an example of a histogram in a case where the noise has an intermediate degree;

FIG. 7 is an exemplary block diagram showing a constitution example in which a parameter of a noise removing circuit can be adjusted based on a noise amount obtained by the constitution of FIG. 1;

FIGS. 12A to 12C are exemplary views of operations of an erroneously detected histogram exclusion judging section 25c;

FIG. 13 is an exemplary diagram showing a constitution of a fourth embodiment of the erroneously detected histogram exclusion judging section according to the present invention;

FIG. 17 is an exemplary block diagram showing a constitution example in which the parameter of the noise removing circuit can be adjusted based on a noise amount obtained by the constitution of FIG. 15;

FIG. 20 is an exemplary diagram showing a constitution of a sixth embodiment of the erroneously detected histogram exclusion judging section according to the present invention.

DETAILED DESCRIPTION

Figure 6:
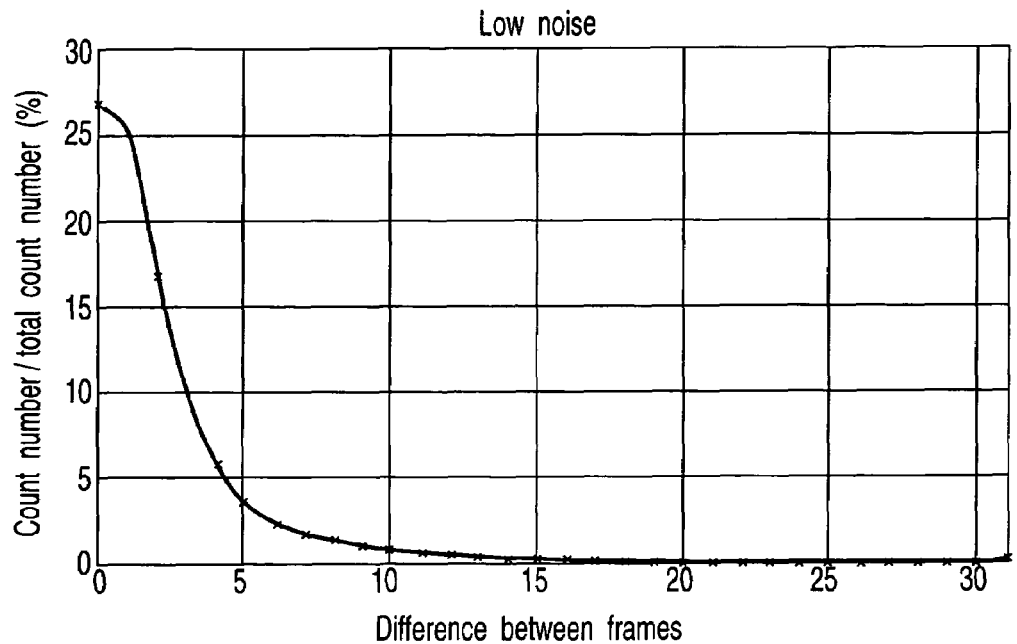
FIG. 6 is an exemplary diagram showing an example of a histogram in a case where the noise is small.

Embodiments of the present invention will be described hereinafter with reference to the drawings.

FIG. 1 is a block diagram showing a constitution of an image processing device according to a first embodiment of the present invention.

The image processing device can be mounted on, for example, a digital television receiver, a recorder/player or the like, and realized in the form of an large scale integration (LSI) or the like. This image processing device has a function of detecting a noise included in a signal of an effective image region (image region excluding vertical and horizontal blanking periods) of transmitted digital dynamic image data.

In the first embodiment of this image processing device, a difference of the corresponding pixel between frames is generated from a current signal of a dynamic image in which a plurality of frames continue, and a noise removed frame delay signal obtained by subjecting this current signal to noise removal processing and delay processing for one frame. Moreover, after excluding a difference corresponding to a pixel in which a change (picture change) having a value that is not less than a certain value is generated from individual generated differences, a histogram indicating a frequency distribution of differences is generated, and a noise amount is decided based on the generated histogram.

The image processing device is provided with: a noise removing circuit 11; a frame memory 12; an inter-frame difference generation circuit 13; a band pass filter 14; a selector 15; an absolute value generation circuit 16; a limiter 17; a switch 18; a histogram generation circuit 19; a movement detection circuit 20; an edge detection circuit 21; a detected region designation circuit 22; a count SW control circuit 23; a histogram counter reset circuit 24; and a noise amount deciding section 26.

The noise removing circuit 11 is a noise removing circuit in which a system called a frame cyclic type is adopted, and subjects the current signal of the dynamic image to noise removal processing to generate a noise removed current signal while inputting an inter-frame difference signal and a noise removing circuit parameter described later. The generated noise removed current signal is sent to the frame memory 12.

The frame memory 12 inputs the noise removed current signal generated by the noise removing circuit 11 to temporarily store the signal, and outputs a noise removed frame delay signal after a delay time for one frame. This noise removed frame delay signal is sent to the inter-frame difference generation circuit 13, the movement detection circuit 20, and the edge detection circuit 21.

The inter-frame difference generation circuit 13 generates an inter-frame difference signal indicating a pixel value difference of the corresponding pixel between the frames from the current signal of the dynamic image and the noise removed frame delay signal. For example, in the pixel in which a change (change of a signal level) having a certain or more value is generated in a picture between the frames, the inter-frame difference signal contains a component attributable to the change of the picture in addition to the noise component. The generated inter-frame difference signal is sent to the noise removing circuit 11, the band pass filter 14, and the selector 15.

The band pass filter 14 removes a DC component from the inter-frame difference signal generated by the inter-frame difference generation circuit 13. When the DC component is removed, a component attributable to the micro picture change that cannot be detected even in movement detection described later can be removed.

The selector 15 selects one of the inter-frame difference signal processed by the band pass filter 14 and the inter-frame difference signal which has not been processed to send the signal to the selector 15. It is to be noted that a configuration may be constituted in which the band pass filter 14 is constantly used without disposing this selector 15 or in which either the selector 15 or the band pass filter 14 is not disposed.

The absolute value generation circuit 16 generates an inter-frame difference absolute value signal indicating an absolute value (magnitude of a difference) of the difference indicated by the inter-frame difference signal.

The limiter 17 limits passage of a signal having a level which is not less than a certain value and at which a histogram described later does not have to be generated with respect to the inter-frame difference absolute value signal generated by the absolute value generation circuit 16 to generate an inter-frame difference histogram input signal. This inter-frame difference histogram input signal indicates a difference signal level of each pixel. It is to be noted that the limiter 17 is not necessarily required.

The switch 18 is controlled by the count SW control circuit 23, and supply of the inter-frame difference histogram input signal to the histogram generation circuit 19 is turned on/off every pixel.

The histogram generation circuit 19 inputs the inter-frame difference signal (absolute value) from the limiter 17, when the switch 18 is on. The histogram generation circuit 19 includes a plurality of counters 191a to 191n for counting pixels having the signal level for each signal level of the input difference signal. Each counter counts the pixels having the equal difference signal level. For example, the counter 191a counts pixels having difference signal level 0. That is, the histogram generation circuit 19 generates an inter-frame difference histogram indicating a frequency distribution of the difference signal levels.

It is to be noted that a constitution may be used in which one counter counts the pixels included in a level region including a plurality of levels to decrease the counters. A count result of each counter is sent as an inter-frame difference histogram DHI to an erroneously detected histogram exclusion judging section 25 via a plurality of (plurality of bits of) signal lines. In this case, information of the count result may be subjected to processing to compress or decrease the information before the information is sent to the erroneously detected histogram exclusion judging section 25.

The movement detection circuit 20 detects the pixel in which the inter-frame difference signal level of a low frequency component excluding any noise component indicates a value that is not less than a predetermined threshold value to output a detection result as a movement detection signal. That is, the movement detection circuit 20 detects movement of the picture in the image.

The edge detection circuit 21 detects the pixel in which a level change of the inter-frame difference signal includes a high frequency component to output a detection result as an edge detection signal. As a result, the edge detection circuit 21 detects the pixel whose difference in the signal level from the adjacent pixel is not less than a predetermined threshold value.

The detected region designation circuit 22 inputs a vertical synchronizing signal and a horizontal synchronizing signal, and outputs a region designating signal which designates a region (e.g., effective image region) as an object of histogram generation. It is to be noted that this detected region designation circuit 22 can spatially thin the pixel which is the object of the histogram generation.

The count SW control circuit 23 sets the region which is the object of the histogram generation to a region designated by the detected region designation circuit 22, and controls the switch 18 in such a manner that the difference corresponding to the pixel detected by the movement detection circuit 20 and the difference corresponding to the pixel detected by the edge detection circuit 21 are removed from the objects of the histogram generation. That is, the count SW control circuit 23 turns on the switch 18 while either the movement detection signal or the edge detection signal is not input in the region designated by the detected region designation circuit 22. The count SW control circuit 23 turns off the switch 18 while at least one of the movement detection signal and the edge detection signal is input, so that the corresponding pixel is prevented from being counted. As a result, there is little change in the picture between the frames, and there is obtained difference information (histogram) on the pixel of a flat-picture region in the frame.

The histogram counter reset circuit 24 inputs the vertical and horizontal synchronizing signals, and resets a value of each counter of the histogram generation circuit 19 at a timing when a signal indicating the histogram of each frame is output from each counter of the histogram generation circuit 19. Here, the value is reset for each frame, but may be reset every plurality of frames. In this case, since each counter of the histogram generation circuit 19 performs the counting over a plurality of frames, the histograms integrated over the plurality of frames are generated.

The erroneously detected histogram exclusion judging section 25 inputs the inter-frame difference histogram DHI, and judges whether or not the histogram is to be used in noise amount decision in the noise amount deciding section 26 of the subsequent stage.

The noise amount deciding section 26 decides the noise amount in the dynamic image with respect to the only histogram judged to be used in the noise amount decision by the erroneously detected histogram exclusion judging section 25. The noise amount can be decided using at least one of a standard deviation, scattering, and average value of the frequency distribution indicated by the histogram. This judgment result can be utilized in adjustment of various types of parameters (parameter which determines a degree of contour emphasis of the image, etc.) concerning the control of the dynamic image. It is to be noted that the histogram may be prepared on the side of the noise amount deciding section 26 to decide the noise amount.

As described above, in the image processing device according to the present embodiment, after the current signal of the dynamic image is subjected to noise removal processing and delay processing for one frame, the noise removed frame delay signal is generated, and the inter-frame difference signal is generated based on the current signal and the noise removed frame delay signal. This inter-frame difference signal is subjected to various types of necessary processing, and supplied as the inter-frame difference histogram input signal to the histogram generation circuit 19. Moreover, movement detection or edge detection is performed based on the current signal and the noise removed frame delay signal, and the inter-frame difference signal corresponding to the detected element is prevented from being supplied to the histogram generation circuit 19. Accordingly, the histogram is generated in a state in which a difference component attributable to the picture change between the frames or the pixels and unnecessary for the noise detection is removed. Therefore, the amount of the noise in the dynamic image is accurately decided.

FIG. 2 is a block diagram showing a constitution of the movement detection circuit 20 shown in FIG. 1.

The movement detection circuit 20 is provided with, for example, an inter-frame difference generation circuit 31, a low pass filter 32, an absolute value generation circuit 33, a level comparison circuit 34, and a movement detection signal area filter 35.

The inter-frame difference generation circuit 31 generates an inter-frame difference signal indicating a pixel value difference of the corresponding pixel between the frames based on the current signal of the dynamic image and the noise removed frame delay signal. It is to be noted that instead of disposing this inter-frame difference generation circuit 31, an output signal of the inter-frame difference generation circuit 13 having the same function as described above with reference to FIG. 1 may be supplied to the low pass filter 32.

The low pass filter 32 removes a high band component, that is, a noise component from the inter-frame difference signal generated by the inter-frame difference generation circuit 31 to generate a low-band inter-frame difference signal. This low-band inter-frame difference signal indicates a change due to the movement of the picture between the frames, and is not any noise.

The absolute value generation circuit 33 generates a low-band inter-frame difference absolute value signal indicating an absolute value (magnitude of a difference) of the difference indicated by the low-band inter-frame difference signal generated by the low pass filter 32.

The level comparison circuit 34 detects the pixel in which the level of the low-band inter-frame difference absolute value signal generated by the absolute value generation circuit 33 is not less than a movement detection level threshold value, and generates a signal indicating a detection result.

The movement detection signal area filter 35 enlarges a region of the pixel of the difference which is not less than the movement detection level threshold value, output from the level comparison circuit 34, and outputs a movement detection signal. This enlargement processing may be performed with respect to an only horizontal direction or both of the horizontal direction and a vertical direction.

According to such constitution, the detection result of the pixel indicating that the low-band inter-frame difference absolute value signal is not less than a predetermined threshold value can be obtained as the movement detection signal.

FIG. 3 is a block diagram showing a constitution of the edge detection circuit 21 shown in FIG. 1.

The edge detection circuit 21 is provided with, for example, an inter-frame difference generation circuit 41, a band pass filter 42, an absolute value generation circuit 43, a level comparison circuit 44, and an edge detection signal area filter 45.

The inter-frame difference generation circuit 41 generates an inter-frame difference signal indicating a pixel difference between the frames based on the current signal of the dynamic image and the noise removed frame delay signal. It is to be noted that this inter-frame difference generation circuit 41 does not have to be necessarily disposed like the inter-frame difference generation circuit 31 of FIG. 3.

The band pass filter (BPF) 42 removes a low band component from the inter-frame difference signal generated by the inter-frame difference generation circuit 41 to generate a high-band inter-frame difference signal. This high-band inter-frame difference signal indicates an edge portion of a picture. It is to be noted that this processing may be performed with respect to the only horizontal direction or both of the horizontal and vertical directions.

The absolute value generation circuit 43 generates a high-band inter-frame difference absolute value signal indicating an absolute value (magnitude of a difference) of the inter-frame difference signal generated by the band pass filter 42.

The level comparison circuit 44 detects the pixel indicating that the level of the high-band inter-frame difference absolute value signal generated by the absolute value generation circuit 43 is not less than an edge detection level threshold value, and generates a signal indicating a detection result.

The edge detection signal area filter 45 enlarges a region of the pixel of the difference which is not less than the edge detection level threshold value, output from the level comparison circuit 44, and outputs an edge detection signal. This enlargement processing may be performed with respect to the only horizontal direction or both of the horizontal and vertical directions.

According to such constitution, the detection result of the pixel indicating that a difference of a signal level from the adjacent pixel is not less than a predetermined value (threshold value) can be obtained as the edge detection signal.

FIGS. 4 to 6 are diagrams showing examples of the histogram generated by the histogram generation circuit 19 shown in FIG. 1. In the examples of the histogram in FIGS. 4 to 6, the abscissa indicates an inter-frame difference level, and the ordinate indicates a normalized count value (i.e., count number/total count number), that is, frequency. FIG. 4 shows one example of a case where the noise is large, FIG. 5 shows one example of a case where the noise is medium, and FIG. 6 shows one example of a case where the noise is small.

In the histogram (high noise) of FIG. 4, a standard deviation, scattering, or absolute value of a frequency distribution is comparatively large as compared with the histogram of FIG. 5 (middle noise). On the other hand, in the histogram (low noise) of FIG. 6, the standard deviation, scattering, or absolute value of the frequency distribution is comparatively small as compared with the histogram of FIG. 5 (middle noise).

For example, the noise amount deciding section 26 judges that the noise amount is large, when the standard deviation, scattering, or absolute value of the frequency distribution indicated by the histogram is larger. Alternatively, it is judged that the noise amount is large, when a value obtained by summing up count values exceeding the threshold value among the individual count values in each inter-frame difference is larger.

FIG. 7 shows a first embodiment of an image processing device which removes the dynamic image noise according to the present invention using the image processing device shown in FIG. 1.

In this image processing device, a parameter deciding section 27 and a parameter setting section 28 are added to the constitution of FIG. 1. This image processing device is constituted in such a manner that a parameter of the noise removing circuit 11 can be adjusted based on the noise amount obtained by the constitution of FIG. 1. It is to be noted that elements common to those of FIG. 1 are denoted with the same reference numerals, and detailed description thereof is omitted.

The parameter deciding section 27 decides a value of a predetermined parameter (frame cyclic coefficient or the like) in the noise removing circuit 11 based on the noise amount decided by the noise amount deciding section 26.

The parameter setting section 28 sets the value of the parameter used by the noise removing circuit 11 to the value decided by the parameter deciding section 27.

According to such constitution, the value of the parameter in the noise removing circuit 11 is appropriately adjusted depending on the noise amount decided by the noise amount deciding section 26.

According to the first embodiment of the image processing device which detects the dynamic image noise and the image processing device which removes the dynamic image noise, the detection result can be obtained in which an influence by the change of the picture is reduced as much as possible in the noise detection with respect to the effective image region of a digital dynamic image signal. When the parameter of the noise removing circuit is adjusted using this detection result, optimum noise removal can be performed.

The erroneously detected histogram exclusion judging section 25 in the image processing device according to the present invention will be described hereinafter in detail.

The erroneously detected histogram exclusion judging section 25 excludes a histogram which is inappropriate as that for use in the decision of the noise amount by the noise amount deciding section 26 from inter-frame difference histograms generated by the histogram generation circuit 19. For example, the erroneously detected histogram exclusion judging section 25 judges that a histogram having a peculiar shape (characteristic) of the inter-frame difference histogram is a histogram having low reliability, and prevents the histogram from being used in the noise amount decision by the noise amount deciding section 26. Accordingly, the noise amount deciding section 26 can perform more highly reliable judgment processing. The histogram having the peculiar shape includes, for example, a histogram having a movement component which cannot be detected by the movement detection circuit 20 or an edge component which cannot be detected by the edge detection circuit 21.

Figure 8:
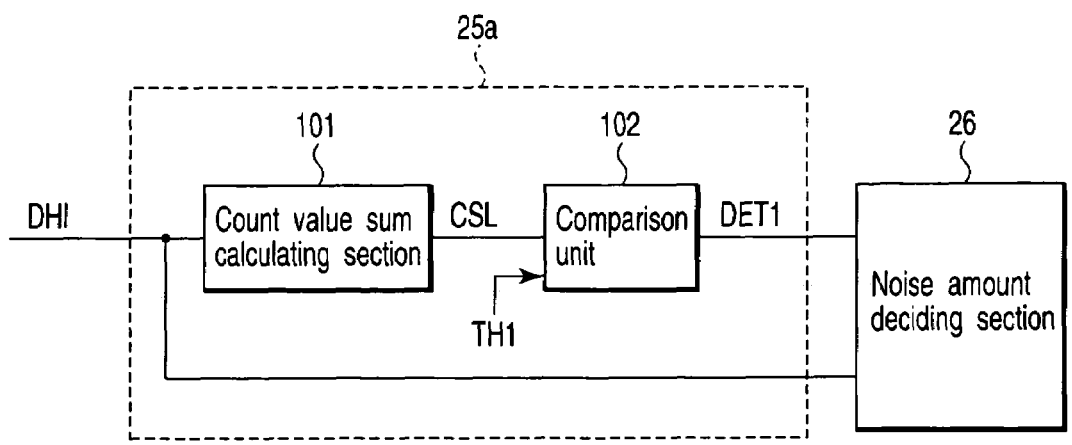
FIG. 8 is an exemplary diagram showing a constitution of the first embodiment of an erroneously detected histogram exclusion judging section according to the present invention.

FIG. 8 shows an erroneously detected histogram exclusion judging section 25a as a first embodiment of the erroneously detected histogram exclusion judging section 25 according to the present invention.

A count value sum calculating section 101 obtains a sum CSL of count numbers of an input inter-frame difference histogram. A comparison circuit 102 compares the sum CSL calculated by the count value sum calculating section 101 with a predetermined threshold value TH1, and provides, for example, "1 (high level)" as a comparison result DET1 in a case where the sum CSL is not more than the predetermined threshold value TH1. As a result, the noise amount deciding section 26 does not use a present difference histogram DHI in deciding the noise amount (does not update the previous difference histogram).

That is, the erroneously detected histogram exclusion judging section 25a judges that the inter-frame difference histogram is not to be used in the noise amount decision in a case where the sum CSL is not more than the predetermined threshold value TH1. According to such constitution, the number of the pixels constituting the inter-frame difference histogram is remarkably small, the histogram having a possibility of generating a large detection error can be excluded from the noise amount decision, and more highly reliable noise amount decision can be performed.

Figure 9:
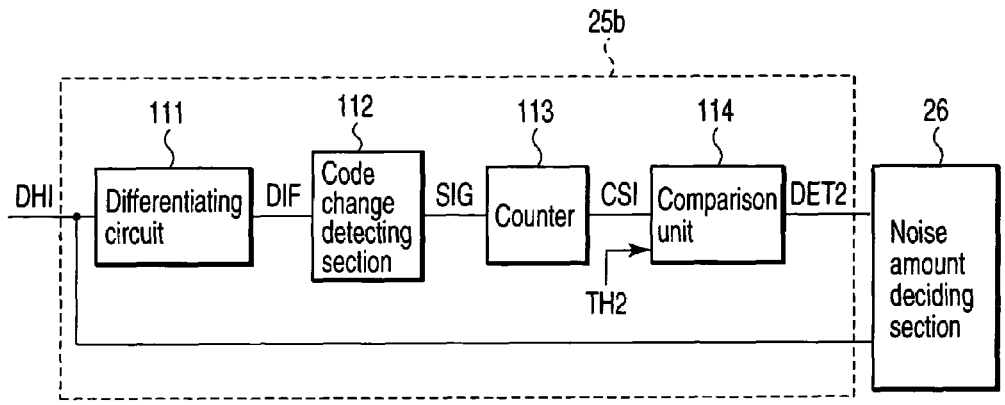
FIG. 9 is an exemplary diagram showing a constitution of a second embodiment of the erroneously detected histogram exclusion judging section according to the present invention.

FIG. 9 shows an erroneously detected histogram exclusion judging section 25b as a second embodiment of the erroneously detected histogram exclusion judging section 25 according to the present invention in the dynamic image noise detection device and the dynamic image noise removing device.

A differentiating circuit 111 calculates a differential value DIF of the histogram DHI based on each count number of the inter-frame difference histogram DHI. A sign change detecting section 112 detects a sign change point SIG of the differential value DIF. A counter 113 counts the number CSI of maximum points of the histogram based on the sign change point SIG. A comparison unit 114 compares the number CSI of the maximum points with a predetermined threshold value TH2, and provides, for example, "1 (high level)" as a comparison result DET2 in a case where the number CSI of the maximum values is not less than the predetermined threshold value TH2. As a result, the noise amount deciding section 26 uses the present difference histogram DHI in the noise amount decision.

Figures 10A, 10B, 10C:
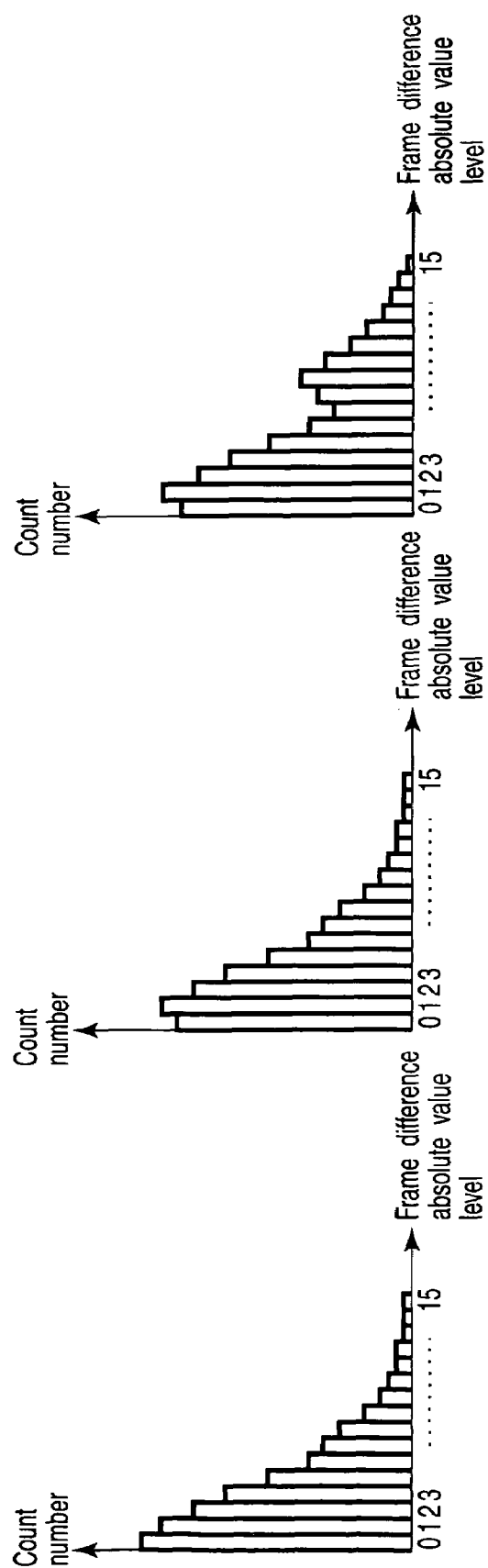
FIGS. 10A to 10C are exemplary views of a maximum point of a difference histogram between frames.

FIG. 10 is an explanatory view of the maximum point of the inter-frame difference histogram. FIG. 10A shows a case where there is not any maximum point, FIG. 10B shows a case where there is one maximum point, and FIG. 10C shows a case where there are two maximum points.

The erroneously detected histogram exclusion judging section 25b judges that the inter-frame difference histogram is not to be used in the noise amount decision in a case where the number CSI of the maximum values is not less than the predetermined threshold value TH2 (2 in the present embodiment). According to such constitution, the inter-frame difference histogram in which a component such as a movement component other than a random noise is mixed by mistake can be excluded from the noise amount decision, and more stable noise amount decision can be performed.

Figure 11:
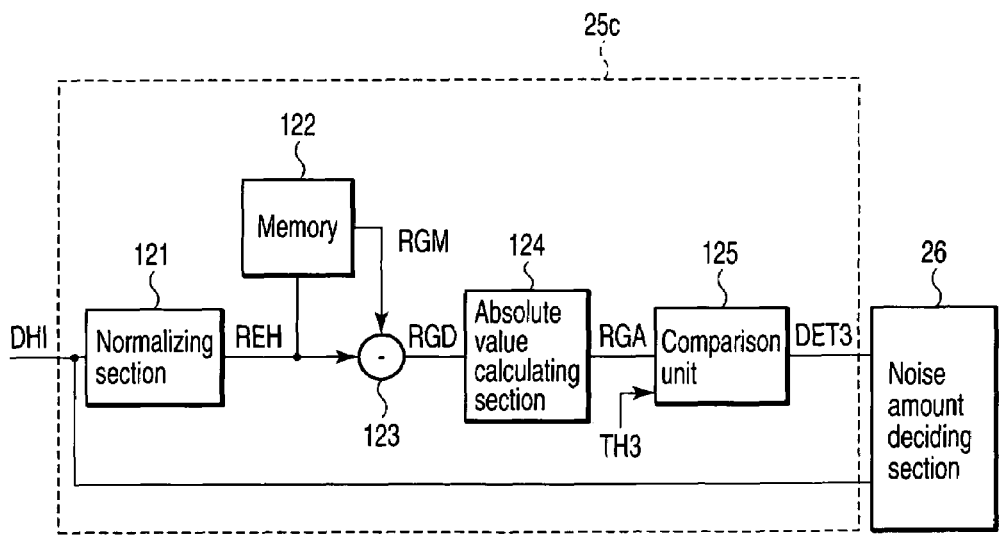
FIG. 11 is an exemplary diagram showing a constitution of a third embodiment of the erroneously detected histogram exclusion judging section according to the present invention.

FIG. 11 shows an erroneously detected histogram exclusion judging section 25c as a third embodiment of the erroneously detected histogram exclusion judging section 25 in the dynamic image noise detection device and the dynamic image noise removing device according to the present invention.

A normalizing section 121 normalizes each count number of the input inter-frame difference histogram DHI by means of a sum of count numbers, and provides a normalized histogram REH. A memory 122 delays the normalized histogram REH by one frame period to provide a delayed histogram RGM. A subtracter 123 calculates a difference between the present normalized histogram REH output from the normalizing section 121 and the delayed histogram RGM output from the memory 122, and provides a difference normalized histogram RGD. An absolute value circuit 124 generates an absolute value histogram RGA which is an absolute value of the difference normalized histogram RGD, and a comparison circuit 125 compares the histogram RGA with a predetermined threshold value TH3. The comparison circuit 125 provides, for example, "1" as a comparison result DET3 in a case where there exists the count number that is not less than the predetermined threshold value TH3 among the respective count numbers constituting the absolute value histogram RGA. As a result, the noise amount deciding section 26 does not use the present difference histogram DHI in the noise amount decision.

FIG. 12 is an explanatory view of an operation of the erroneously detected histogram exclusion judging section 25c. FIG. 12A shows one example of a histogram acquired just before, that is, the delayed normalized histogram RGM, FIG. 12B shows one example of the present normalized histogram REH, and FIG. 12C shows the absolute value RGA of the difference normalized histogram RGD. It is to be noted that in FIGS. 12A to 12C, the normalized count number indicated by the ordinate is a value obtained by dividing the count number by the sum of the count numbers (count number/sum of count numbers).

That is, the erroneously detected histogram exclusion judging section 25c calculates a difference between the present difference histogram DHI and the previous difference histogram RGM, and prepares the absolute value histogram RGA (see FIG. 12C) indicating the absolute value of the difference. The erroneously detected histogram exclusion judging section 25c judges that the present histogram DHI is not to be used in the noise amount decision in a case where there exists the count number that is not less than the predetermined threshold value TH3 in the absolute value histogram RGA.

According to such constitution, the inter-frame difference histogram formed into a peculiar shape owing to erroneous detection by the movement detection circuit 20 and the edge detection circuit 21 can be excluded from the noise amount decision, and more stable noise amount decision can be performed.

FIG. 13 shows an erroneously detected histogram exclusion judging section 25d as a fourth embodiment of the erroneously detected histogram exclusion judging section 25 in the dynamic image noise detection device and the dynamic image noise removing device according to the present invention.

A normalizing section 131 normalizes each count number of the inter-frame difference histogram DHI by means of the sum of the count numbers, and generates a normalized histogram REH. A standard deviation calculating section 132 calculates a standard deviation STA (or scattering) based on the normalized histogram REH. An absolute value calculating section 134 calculates an average value AVE based on the normalized histogram REH. A memory 135 delays the standard deviation STA and the average value AVE by one frame period, respectively, to provide a delayed standard deviation STM and a delayed average value AVM.

A subtracter 136 calculates a difference between the standard deviation STA and the delayed standard deviation STM, and provides a difference standard deviation STD. A subtracter 137 calculates a difference between the average value AVE and the delayed average value AVM, and provides a difference average value AVD. An absolute value circuit 138 calculates an absolute value STDA of the difference standard deviation STD, and an absolute value circuit 139 calculates an absolute value AVDA of the difference average value AVD. A comparison circuit 140 compares the absolute value STDA with a predetermined threshold value TH4, and provides, for example, "1" as a comparison result STC in a case where the absolute value STDA is not less than the predetermined threshold value TH4. A comparison circuit 141 compares the absolute value AVDA with a predetermined threshold value TH5, and provides, for example, "1" as a comparison result AVC in a case where the absolute value AVDA is not less than the predetermined threshold value TH5. An OR circuit 142 subjects the comparison results STC and AVC to OR operation to provide an operation result DET4. When the operation result DET4 is "1", the noise amount deciding section 26 does not use the present difference histogram DHI in the noise amount decision.

That is, the detected histogram exclusion judging section 25d normalizes the present inter-frame difference histogram, and the previously acquired inter-frame difference histogram closest to the present inter-frame difference histogram, and calculates standard deviations (or scatterings) and average values, respectively. In a case where the absolute value AVDA of the difference of the average value between the present and previous histograms is not less than the predetermined threshold value TH5, or the absolute value STDA of the difference of the standard deviation (or scattering) between the histograms is not less than the predetermined threshold value TH4, the present inter-frame difference histogram is not used in the noise amount decision.

According to such constitution, the inter-frame difference histogram formed into a peculiar shape owing to erroneous detection by the movement detection circuit 20 and the edge detection circuit 21 can be excluded from the noise amount decision, and more stable noise amount decision can be performed.

Figure 14:
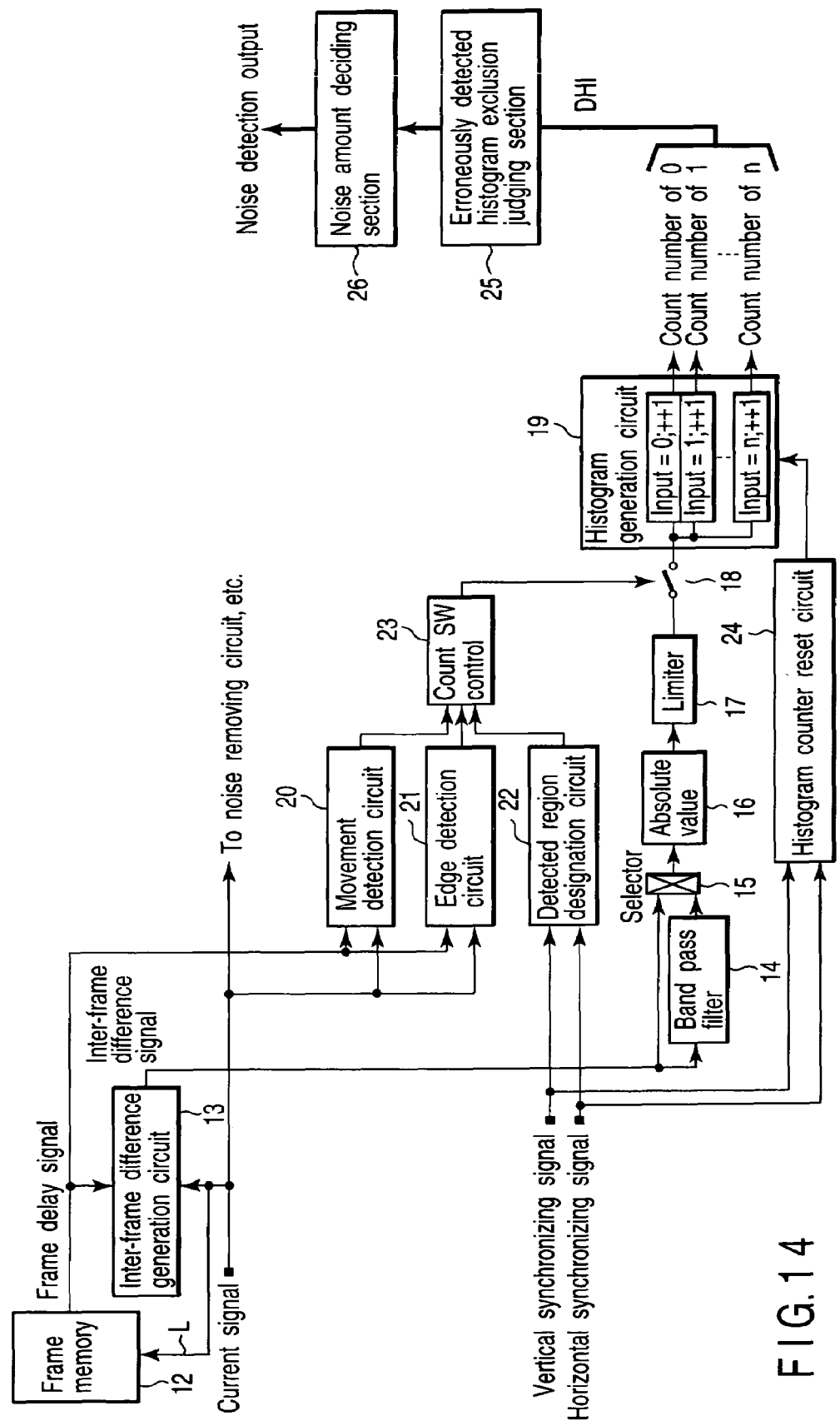
FIG. 14 is an exemplary block diagram showing a constitution of an image processing device according to a second embodiment of the present invention.

FIG. 14 shows a second embodiment of the image processing device according to the present invention. Elements common to those of FIG. 1 are denoted with the same reference numerals, and detailed description thereof is omitted.

In the image processing device (FIG. 1) according to the first embodiment, the frame memory 12 inputs and temporarily stores the noise removed current signal generated by the noise removing circuit 11, and outputs the noise removed frame delay signal after the delay time for one frame.

On the other hand, in the second embodiment (FIG. 14) of the image processing device, a frame memory 12 does not input the noise removed current signal, but inputs the current signal to temporarily store the signal, and outputs a frame delay signal after a delay time for one frame. Therefore, an inter-frame difference generation circuit 13 generates an inter-frame difference signal indicating a pixel value difference of the corresponding pixel between frames based on the current signal of a dynamic image and the frame delay signal. Therefore, the image processing device can be constituted without being combined with the frame cyclic type noise removing circuit 11.

In the image processing device constituted in this manner, the frame delay signal is generated by subjecting the current signal of the dynamic image to delay processing as much as one frame, and the inter-frame difference signal is generated from the current signal and the frame delay signal. After subjecting this inter-frame difference signal to various types of necessary processing, the signal is supplied as an inter-frame difference histogram input signal to a histogram generation circuit 19. Moreover, movement or edge detection is performed based on the current signal and the frame delay signal, and a signal corresponding to the detected pixel is prevented from being supplied to the histogram generation circuit 19. Accordingly, the histogram is generated based on the difference signal from which a component unnecessary for noise detection is removed, the component being attributable to a change of a picture or the like between the frames or the pixels. Therefore, an amount of noise in the dynamic image is judged with a good precision.

It is to be noted that the parameter deciding section 27 and the parameter setting section 28 described with reference to FIG. 7, and a noise removing circuit may be added to the constitution of FIG. 14. According to the second embodiment of the image processing device, an effect similar to that of the first embodiment can be obtained.

Figure 15:
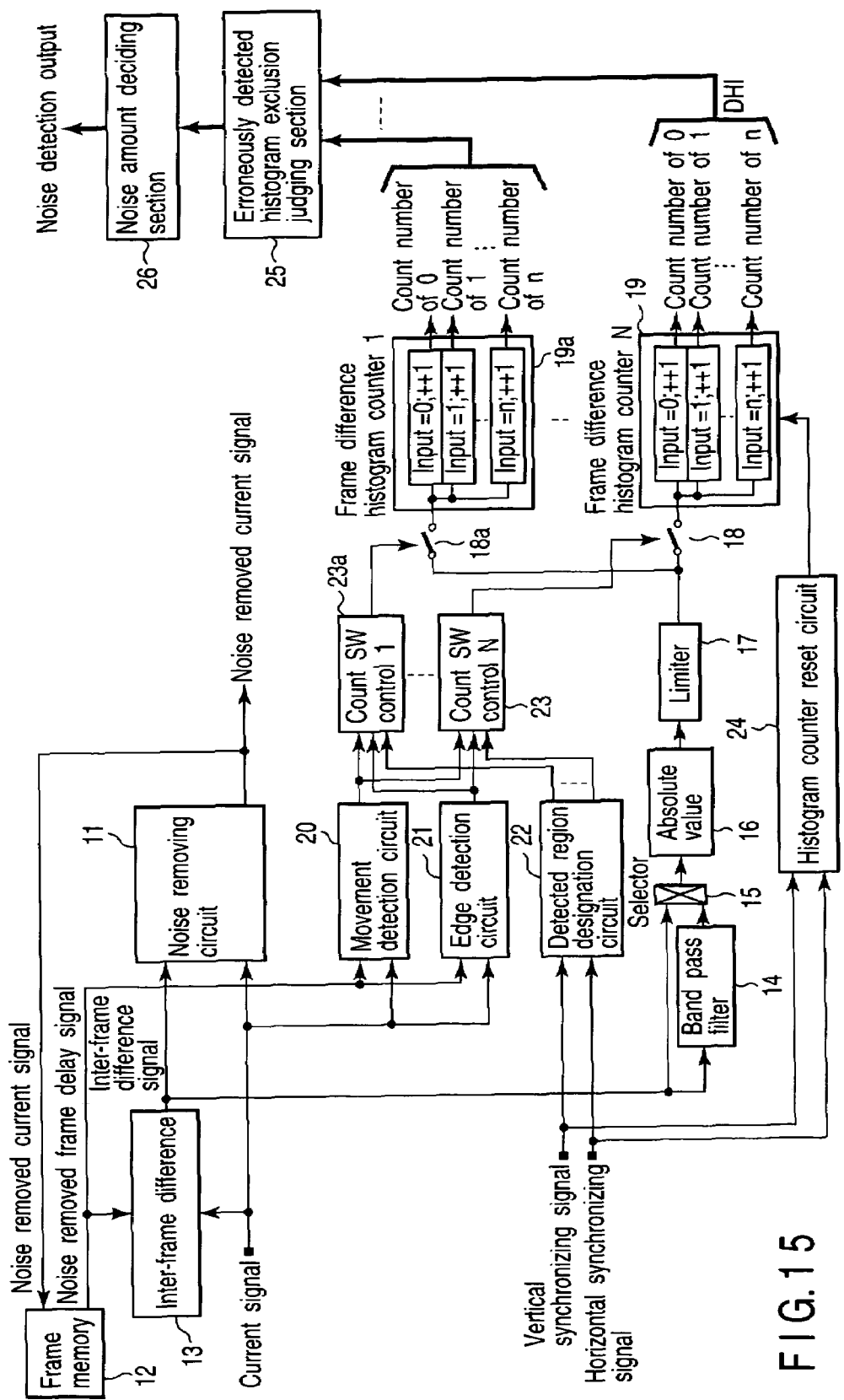
FIG. 15 is an exemplary block diagram showing a constitution of an image processing device according to a third embodiment of the present invention.
Figure 16:
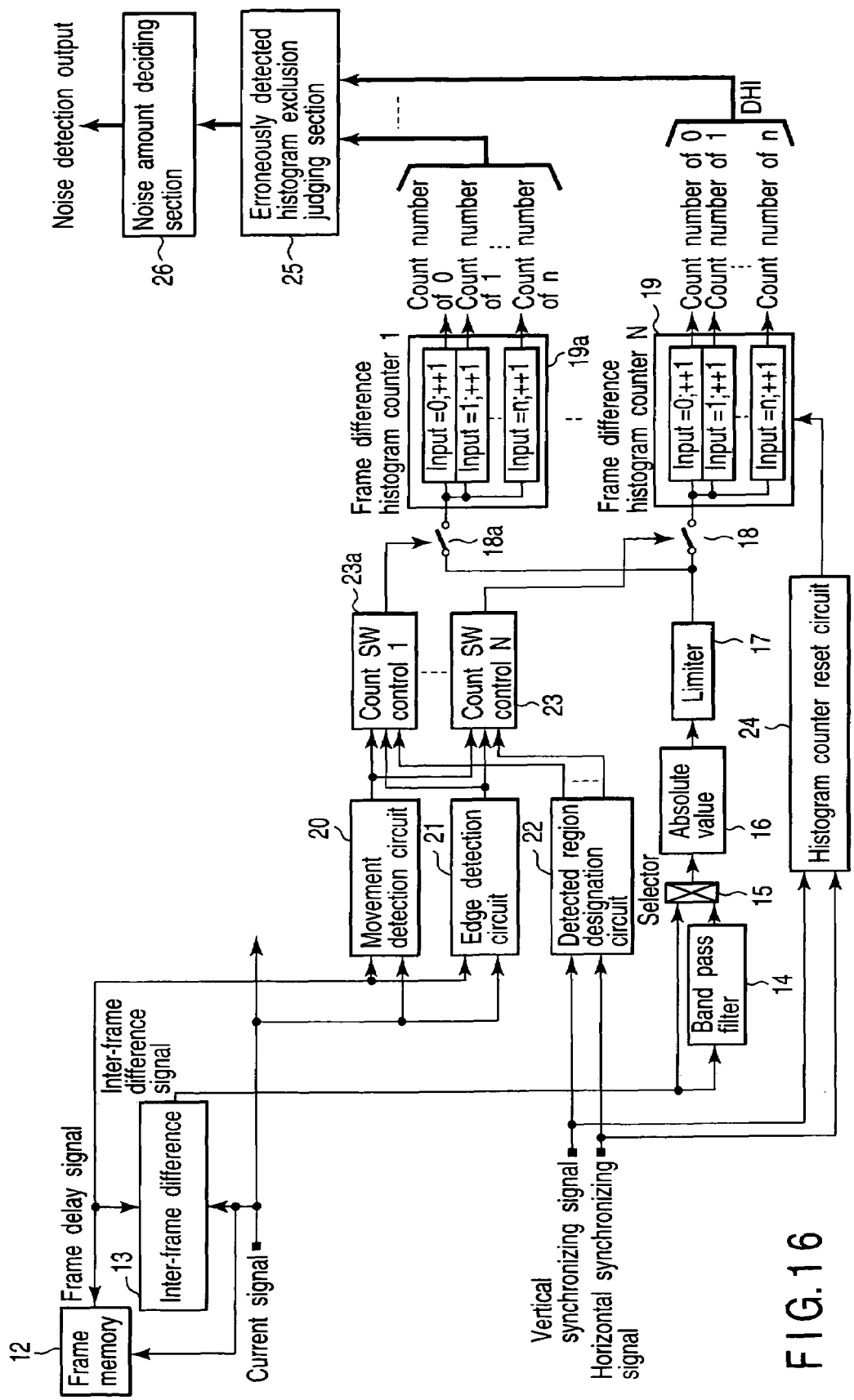
FIG. 16 is an exemplary block diagram showing a constitution of an image processing device according to a fourth embodiment of the present invention.

FIGS. 15 and 16 showing third and fourth embodiments of the image processing device which detects the noise according to the present invention. FIG. 17 shows a second embodiment of the image processing device which removes the dynamic image noise according to the present invention. They are different from the examples shown in FIGS. 1, 7, and 14 in that inter-frame difference histograms can be generated in N regions in one screen in a constitution including count SW control circuits 23a . . . and inter-frame difference histograms 19a . . . .

Figure 18A:
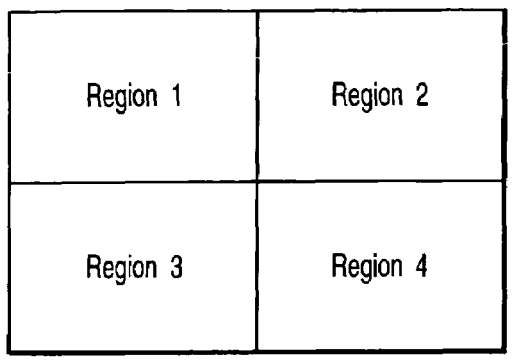
FIGS. 18A and 18B are exemplary diagrams showing a setting example of a region in which a difference histogram between frames is detected.

FIG. 18 shows a setting example of a region in which an inter-frame difference histogram is detected. FIG. 18A shows an example in which one screen (frame) is divided into four. The difference histogram usually has a similar property (shape) in any region of one screen. Therefore, for example, in the difference histograms of two regions, count values of corresponding difference levels are substantially equal to each other. An erroneously detected histogram exclusion judging section 25 compares the difference histograms of mutually different regions in one screen. In a case where there is a difference larger than a predetermined threshold value among the differences of the count values of the difference levels corresponding to each other, the inter-frame difference histogram is excluded from the histograms for use in noise amount decision.

Figure 18B:
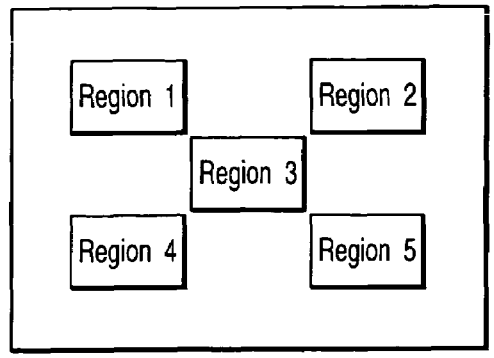

FIG. 18B shows an example in which a plurality of regions are set in a region excluding an area around the screen. When the regions are set excluding the area around the screen, the regions are not influenced by a dynamic image into which a size panel or a letter box is inserted.

Figure 19:
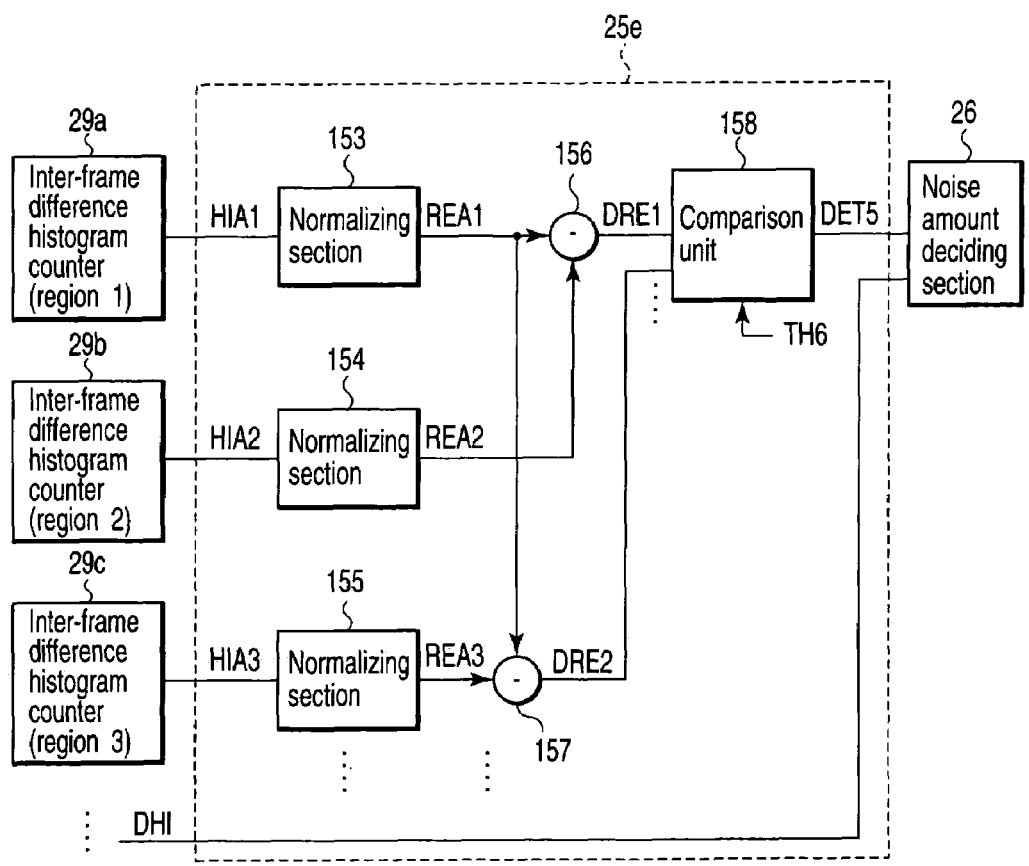
FIG. 19 is an exemplary diagram showing a constitution of a fifth embodiment of the erroneously detected histogram exclusion judging section according to the present invention.

An embodiment of the erroneously detected histogram exclusion judging section 25 will be described hereinafter in the image processing devices of FIGS. 15 and 16 and the image processing device of FIG. 17. FIG. 19 shows a fifth embodiment of the erroneously detected histogram exclusion judging section 25 as an erroneously detected histogram exclusion judging section 25e.

An inter-frame difference histogram counter 29a prepares a histogram HIA1 in Region 1. A normalizing section 153 normalizes each count number of the histogram HIA1 by means of the sum of count numbers, and provides a normalized histogram REA1. An inter-frame difference histogram counter 29b prepares a histogram HIA2 in Region 2. A normalizing section 154 normalizes each count number of the histogram HIA2 by means of the sum of count numbers, and provides a normalized histogram REA2. A subtracter 156 calculates a difference between the normalized histograms REA1 and REA2 to generate a difference normalized histogram DRE1.

Similarly, an inter-frame difference histogram counter 29c prepares a histogram HIA3 in Region 3. A normalizing section 155 provides a normalized histogram REA3. A subtracter 157 calculates a difference between the normalized histograms REA1 and REA3 to generate a difference normalized histogram DRE2.

As described above, the normalizing section is disposed for each region as shown in FIG. 18, and each subtracter calculates a difference between two histograms among N normalized histograms. A comparison unit 158 compares an absolute value of a count value of each of the difference normalized histograms DRE1, DRE2, . . . with a predetermined threshold value TH6, and provides, for example, "1" as a comparison result DET5 in a case where there is an absolute value that is not less than the predetermined threshold value TH6 among the absolute values of the respective count values. As a result, the noise amount deciding section 26 does not use the present difference histogram DHI in noise amount decision.

That is, the erroneously detected histogram exclusion judging section 25e obtains the absolute value of the difference of the corresponding normalized count number (count number/sum of count numbers) between two histograms among the inter-frame difference histograms of N regions in an input present frame, respectively. In a case where there is one or more histogram combinations in which there is an absolute value that is not less than the predetermined threshold value TH6 among the absolute values of the differences, the input present inter-frame difference histogram DHI is not used in the noise amount decision.

According to such constitution, the inter-frame difference histogram formed into a peculiar shape in one screen owing to erroneous detection can be excluded from the noise amount decision, and more stable noise amount decision can be performed.

Next, a sixth embodiment of the erroneously detected histogram exclusion judging section 25 will be described in the image processing devices of FIGS. 15 and 16 and the image processing device of FIG. 17. FIG. 20 shows the sixth embodiment of the erroneously detected histogram exclusion judging section 25 as an erroneously detected histogram exclusion judging section 25f.

An inter-frame difference histogram counter 29a prepares a histogram HIA1 in Region 1. A normalizing section 163 normalizes each count number of the histogram HIA1 by means of the sum of count numbers, and generates a normalized histogram REA1. A standard deviation calculating section 165 calculates a standard deviation STA1 based on the normalized histogram REA1. An average value calculating section 166 calculates an average value AVE1 based on the normalized histogram REA1.

Similarly, an inter-frame difference histogram counter 29b prepares a histogram HIA2 in Region 2, a normalizing section 164 provides a normalized histogram REA2, a standard deviation calculating section 167 calculates a standard deviation STA2, and an average value calculating section 168 calculates an average value AVE2. As described above, the histogram counter, the normalizing section, the standard deviation calculating section, and the average value calculating section are disposed for each region shown in FIG. 18. It is to be noted that a scattering calculating section for calculating scattering may be disposed instead of the standard deviation calculating section.

A comparison unit 169 combines two of a plurality of standard deviations STA1, STA2, . . . calculated with respect to a plurality of regions, and calculates a difference absolute value of each standard deviation. Each difference absolute value is compared with a predetermined threshold value TH7 to provide comparison results STC1, STC2, . . . For example, the comparison unit 169 calculates the absolute value of the difference between the standard deviations STA1 and STA2, and outputs, for example, "1" as the comparison result STC1 in a case where the difference absolute value is not less than the predetermined threshold value TH7. An OR circuit 171 performs OR operation based on a plurality of comparison results output from the comparison unit 169, and generates an operation result DET6.

A comparison unit 170 combines two of a plurality of average values AVE1, AVE2, . . . calculated with respect to a plurality of regions, and calculates the absolute value of the difference between the combined average values. Each difference absolute value is compared with a predetermined threshold value TH8 to generate comparison results AVC1, AVC2, . . . . For example, the comparison unit 170 calculates the absolute value of the difference between the average values AVE1 and AVE2, and outputs, for example, "1" as the comparison result AVC1 in a case where the difference absolute value is not less than the predetermined threshold value TH8.

An OR circuit 172 performs OR operation based on a plurality of comparison results output from the comparison unit 170, and provides an operation result DET7. An OR circuit 173 performs OR operation based on the comparison results DET6 and DET7, and provides an operation result DET8.

That is, the erroneously detected histogram exclusion judging section 25f combines two of the standard deviations (or scatterings) in N regions in the input present frame, and compares the absolute value of the difference between the standard deviations with the predetermined threshold value TH7. In a case where there exists a combination in which the absolute value of the difference between the standard deviations is not less than the predetermined threshold value TH7, the erroneously detected histogram exclusion judging section 25f judges that the input present inter-frame difference histogram DHI is not to be used in the noise amount decision.

Furthermore, the erroneously detected histogram exclusion judging section 25f combines two of the average values calculated with respect to N regions in the input present frame, and compares the absolute value of the difference between the average values with the predetermined threshold value TH8. In a case where there exists a combination in which the absolute value of the difference between the average values is not less than the predetermined threshold value TH8, the erroneously detected histogram exclusion judging section 25f judges that the input present inter-frame difference histogram DHI is not to be used in the noise amount decision.

According to such constitution, the inter-frame difference histogram formed into a peculiar shape owing to erroneous detection by the movement detection circuit 20 and the edge detection circuit 21 can be excluded from the noise amount decision, and more stable noise amount decision can be performed.

As described above, according to the present invention, the inter-frame difference absolute value histogram formed to be peculiar owing to the erroneous detection can be excluded from the noise amount decision in the noise detection using the inter-frame difference absolute value histogram in the effective image region, and optimum noise removal can be performed depending on the noise. That is, the noise included in the dynamic image can be detected with good precision.

It is to be noted that the present invention is not limited to the above-described embodiments, and constituting elements can be modified and embodied without departing from the scope in an implementing stage. Various inventions can be formed by an appropriate combination of a plurality of constituting elements disclosed in the above-described embodiments. For example, several constituting elements may be deleted from all the constituting elements described in the embodiments. Furthermore, the constituting elements over the different embodiments may be appropriately combined.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing device comprising:
a difference generating section which generates, in every pixel unit, a difference level of an image between frames from a current signal of a dynamic image in which a plurality of frames continue and a noise removed frame delay signal obtained after the current signal is subjected to noise removal processing and delay processing for one frame;
a histogram generating section to generate a histogram indicating a frequency distribution of the difference levels between the frames by use of a difference level excluding a difference corresponding to a pixel in which predetermined or more image changes are generated among the difference levels generated by the difference generating section;
a judgment section which judges reliability of the histogram generated by the histogram generating section based on one of a property of the histogram and comparison with the previously obtained histogram; and
a noise amount deciding section which decides a noise amount based on the histogram in a case where the judgment section judges that the reliability is not less than a predetermined value.

2. The image processing device according to claim 1, wherein the judgment section includes a sum calculating section which obtains a sum of count numbers of the histograms generated by the histogram generating section, and a comparing section which compares the calculated sum with a predetermined threshold value, and
the histogram Is excluded from the histograms for use in deciding the noise amount in a case where the sum is smaller than the predetermined threshold value.

3. The image processing device according to claim 1, wherein the judgment section includes:
a differentiating section which calculates a differential value of the histogram based on each count number of the histogram generated by the histogram generating section;
a sign change detecting section which detects a sign change point of the differential value;
a counter which counts the number of maximum points of the histogram based on the sign change point; and a comparing section which compares the number of the maximum points with a predetermined threshold value, and the histogram is excluded from the histograms for use in deciding the noise amount in a case where the number of the maximum values is not less than the predetermined threshold value.

4. The image processing device according to claim 1, wherein the judgment section includes:

a normalizing section which provides a normalized histogram obtained by normalizing each count number of the histogram generated by the histogram generating section by means of a sum of the count numbers;

a delaying section which provides a delayed histogram obtained by delaying the normalized histogram by one frame period;

a subtracter which generates a difference normalized histogram obtained by calculating a difference between a present normalized histogram output from the normalizing section and a delayed histogram output from the delaying section;

an absolute value calculating section which generates an absolute value histogram indicating an absolute value of the difference normalized histogram; and a comparing section which compares the absolute value histogram with a predetermined threshold value, and the histogram generated by the histogram generating section is excluded from the histograms for use in deciding the noise amount in a case where there exists a difference level having a count value which is not less than the predetermined threshold value in the absolute value histogram.

5. The image processing device according to claim 1, wherein the judgment section includes:

a normalizing section which normalizes each count number of the histogram generated by the histogram generating section by means of a sum of the count numbers to provide a normalized histogram;

a standard deviation calculating section which calculates a standard deviation of the normalized histogram based on the normalized histogram;

an average value calculating section which calculates an average value of the normalized histogram based on the normalized histogram;

a delaying section which delays the standard deviation and the average value by one frame period to provide a delayed standard deviation and a delayed average value;

a first subtracting section which generates a difference between the standard deviation and the delayed standard deviation as a difference standard deviation;

a second subtracting section which generates a difference between the average value and the delayed average value as a difference average value;

a first absolute value calculating section which generates an absolute value of the difference standard deviation as a standard deviation difference absolute value;

a second absolute value calculating section which generates an absolute value of the difference average value as an average value difference absolute value;

a first comparing section which compares the standard deviation difference absolute value with a first predetermined threshold value; and a second comparing section which compares the average value difference absolute value with a second predetermined threshold value, and the histogram generated by the histogram generating section is excluded from the histograms for use in deciding the noise amount in one of a case where the standard deviation difference absolute value is not less than the predetermined threshold value and a case where the average value difference absolute value is not less than the predetermined threshold value.

6. The image processing device according to claim 1, further comprising:

a movement detecting section to detect a pixel corresponding to a difference signal having a level which is not less than a predetermined level from a low-band difference signal obtained by removing a high-band component of a difference level signal generated by the difference generating section; and a control section which executes a control in such a manner that a difference level corresponding to the pixel detected by the movement detecting section is removed from the difference levels generated by the difference generating section.

7. The image processing device according to claim 1, further comprising:

an edge detecting section to detect a pixel corresponding to a difference signal having a level which is not less than a predetermined level from a high-band inter-frame difference signal obtained by removing a low-band component of a difference level signal generated by the difference generating section; and a control section which executes a control in such a manner that a difference level corresponding to the pixel detected by the edge detecting section is removed from the difference levels generated by the difference generating section.

8. The image processing device according to claim 1, further comprising:

a histogram generating section which generates a plurality of histograms indicating the frequency distribution of the difference levels in a plurality of regions in one frame, wherein the judgment section includes:

a normalizing section which generates a normalized histogram obtained by normalizing each count number of each histogram by means of a sum of the count numbers of the histograms;

a subtracting section which generates a difference normalized histogram obtained by calculating a difference between two arbitrary histograms among the plurality of normalized histograms; and a comparing section which compares the absolute value of each of the count values of the plurality of difference normalized histograms with a predetermined threshold value, and the histogram corresponding to the frame and generated by the histogram generating section is excluded from the histograms for use in deciding the noise amount in a case where there exists an absolute value which is not less than the predetermined threshold value among the absolute values of the respective count values of the plurality of difference normalized histograms.

9. The image processing device according to claim 1, wherein the histogram generating section generates a plurality of histograms individually indicating the frequency distributions of the difference levels in a plurality of regions in one frame, the judgment section includes:

a normalizing section which generates normalized histograms each obtained by normalizing the count numbers of difference levels in a region of the plurality of regions by means of a sum of the count numbers of the difference levels;

a first standard deviation calculating section which calculates a first standard deviation based on the normalized histogram of a first region;

a second standard deviation calculating section which calculates a second standard deviation based on the normalized histogram of a second region; and a comparing section which calculates a difference between the first and second standard deviations and compares the difference with a predetermined threshold value, and the histogram corresponding to the one frame and generated by the histogram generating section is excluded from the histograms for use in deciding the noise amount in a case where the difference between the first and second standard deviations is larger than the threshold value.

10. The image processing device according to claim 1, wherein the noise amount deciding section decides the noise amount by use of at least one of a standard deviation, a scattering, and an absolute value of the frequency distribution indicated by the histogram.

11. The image processing device according to claim 1, further comprising:

a section which sets a parameter for use in the noise removal processing based on the noise amount decided by the noise amount deciding section.

12. An image processing device comprising:

a difference generating section which generates, in every pixel unit, a difference level of an image between frames from a current signal of a dynamic image in which a plurality of frames continue and a frame delay signal obtained after the current signal is subjected to delay processing for one frame;

a histogram generating section to generate a histogram indicating a frequency distribution of the difference levels between the frames by use of a difference level excluding a difference corresponding to a pixel in which predetermined or more image changes are generated among the difference levels generated by the difference generating section;

a histogram excluding section which excludes a histogram inappropriate as a histogram for use in noise amount decision from the histograms generated by the histogram generating section and which provides the remaining histograms; and a noise amount deciding section which decides a noise amount based on the histogram provided by the histogram excluding section.

13. The image processing device according to claim 12, wherein the histogram excluding section includes a sum calculating section which obtains a sum of count numbers of the histograms generated by the histogram generating section, and a comparing section which compares the calculated sum with a predetermined threshold value, and the histogram is excluded from the histograms for use in deciding the noise amount in a case where the sum is smaller than the predetermined threshold value.

14. The image processing device according to claim 12, wherein the histogram excluding section includes:

a differentiating section which calculates a differential value of the histogram based on each count number of the histogram generated by the histogram generating section;

a sign change detecting section which detects a sign change point of the differential value;

a counter which counts the number of maximum points of the histogram based on the sign change point; and a comparing section which compares the number of the maximum points with a predetermined threshold value, and the histogram is excluded from the histograms for use in deciding the noise amount in a case where the number of the maximum values is not less than the predetermined threshold value.

15. The image processing device according to claim 12, wherein the histogram excluding section includes:

a normalizing section which provides a normalized histogram obtained by normalizing each count number of the histogram generated by the histogram generating section by means of a sum of the count numbers;

a delaying section which provides a delayed histogram obtained by delaying the normalized histogram by one frame period;

a subtracter which generates a difference normalized histogram obtained by calculating a difference between a present normalized histogram output from the normalizing section and a delayed histogram output from the delaying section;

an absolute value calculating section which generates an absolute value histogram indicating an absolute value of the difference normalized histogram; and a comparing section which compares the absolute value histogram with a predetermined threshold value, and the histogram generated by the histogram generating section is excluded from the histograms for use in deciding the noise amount in a case where there exists a difference level having a count value which is not less than the predetermined threshold value in the absolute value histogram.

16. The image processing device according to claim 12, wherein the histogram excluding section includes:

a normalizing section which normalizes each count number of the histogram generated by the histogram generating section by means of a sum of the count numbers to provide a normalized histogram;

a standard deviation calculating section which calculates a standard deviation of the normalized histogram based on the normalized histogram;

an average value calculating section which calculates an average value of the normalized histogram based on the normalized histogram;

a delaying section which delays the standard deviation and the average value by one frame period to provide a delayed standard deviation and a delayed average value;

a first subtracting section which generates a difference between the standard deviation and the delayed standard deviation as a difference standard deviation;

a second subtracting section which generates a difference between the average value and the delayed average value as a difference average value;

a first absolute value calculating section which generates an absolute value of the difference standard deviation as a standard deviation difference absolute value;

a second absolute value calculating section which generates an absolute value of the difference average value as an average value difference absolute value;

a first comparing section which compares the standard deviation difference absolute value with a first predetermined threshold value; and a second comparing section which compares the average value difference absolute value with a second predetermined threshold value, and the histogram generated by the histogram generating section is excluded from the histograms for use in deciding the noise amount in one of a case where the standard deviation difference absolute value is not less than the predetermined threshold value and a case where the average value difference absolute value is not less than the predetermined threshold value.

17. The image processing device according to claim 12, further comprising:
   a movement detecting section to detect a pixel corresponding to a difference signal having a level which is not less than a predetermined level from a low-band difference signal obtained by removing a high-band component of a difference level signal generated by the difference generating section; and
   a control section which executes a control in such a manner that a difference level corresponding to the pixel detected by the movement detecting section is removed from the difference levels generated by the difference generating section.

18. The image processing device according to claim 12, further comprising:
   an edge detecting section to detect a pixel corresponding to a difference signal having a level which is not less than a predetermined level from a high-band inter-frame difference signal obtained by removing a low-band component of a difference level signal generated by the difference generating section; and
   a control section which executes a control in such a manner that a difference level corresponding to the pixel detected by the edge detecting section is removed from the difference levels generated by the difference generating section.

19. The image processing device according to claim 12, wherein the histogram generating section generates a plurality of histograms individually indicating the frequency distributions of the difference levels in a plurality of regions in one frame,
   the histogram excluding section includes:
      a normalizing section which generates normalized histograms each obtained by normalizing the count number of difference levels in a region of the plurality of regions by means of a sum of the count numbers of the difference levels;
      a subtracting section which generates a difference normalized histogram obtained by calculating a difference between two arbitrary histograms among the normalized histograms; and
      a comparing section which compares an absolute value of each of the count values of the difference normalized histogram with a predetermined threshold value, and
   the histogram corresponding to the one frame and generated by the histogram generating section is excluded from the histograms for use in deciding the noise amount in a case where there exists an absolute value which is not less than the predetermined threshold value among the absolute values of the respective count values of the difference normalized histogram.

20. An image processing method comprising:
   generating, by a difference generation section, in every pixel unit, a difference of an image between frames from a current signal of a dynamic image in which a plurality of frames continue and a noise removed frame delay signal obtained after the current signal is subjected to noise removal processing and delay processing for one frame;
   generating, by a histogram generation section, a histogram indicating a frequency distribution of difference levels between the frames in a state in which a difference corresponding to a pixel including predetermined or more image changes is removed from the generated differences;
   judging reliability of the generated histogram based on one of a property of the histogram and comparison with the previously obtained histogram; and
   deciding a noise amount based on the histogram in a case where the reliability is not less than a predetermined value.

* * * * *